United States Patent [19]

Berdahl

[11] Patent Number: 4,602,509

[45] Date of Patent: Jul. 29, 1986

[54] FLUIDIC ANGULAR VELOCITY SENSOR

[75] Inventor: C. Martin Berdahl, Sierra Madre, Calif.

[73] Assignee: The United States of America as represented by the Administrator of the National Aeronautics and Space Administration, Washington, D.C.

[21] Appl. No.: 719,794

[22] Filed: Apr. 4, 1985

[51] Int. Cl.[4] .............................................. G01P 3/28
[52] U.S. Cl. ........................................ 73/502; 73/521
[58] Field of Search ............. 73/502, 521; 188/181 R

[56] References Cited

U.S. PATENT DOCUMENTS

| | | | |
|---|---|---|---|
| 336,069 | 2/1886 | Rung | 73/502 |
| 713,986 | 11/1902 | Hudgson | 73/502 |
| 939,209 | 11/1909 | Bristol | 73/502 |
| 1,034,190 | 7/1912 | Bristol | 73/502 |
| 1,559,155 | 10/1925 | Bullock | 73/861.61 |
| 2,614,423 | 10/1952 | Carbone | 73/861.61 |
| 2,750,009 | 6/1956 | Pohl | 188/90 |

Primary Examiner—Anthony V. Ciarlante
Attorney, Agent, or Firm—Paul F. McCaul; John R. Manning; Thomas H. Jones

[57] ABSTRACT

A fluidic sensor providing a differential pressure signal proportional to the angular velocity of a rotary input. In one embodiment the sensor includes a fluid pump having an impeller coupled to a rotary input. A housing forming a constricting fluid flow chamber is connected to the fluid input of the pump. The housing is provided with a fluid flow restrictive input to the flow chamber and a port communicating with the interior of the flow chamber. The differential pressure signal measured across the flow restrictive input is relatively noise free and proportional to the square of the angular velocity of the impeller. In an alternative embodiment, the flow chamber has a generally cylindrical configuration and plates having flow restrictive apertures are disposed within the chamber downstream from the housing port. In this embodiment, the differential pressure signal is found to be approximately linear with the angular velocity of the impeller.

5 Claims, 7 Drawing Figures

FLUIDIC ANGULAR VELOCITY SENSOR

1. Origin of the Invention

The invention described herein was made in the performance of work under a NASA contract, and is subject to the provisions of Public Law 96-517 (35 USC 202) in which the Contractor has elected not to retain title.

BACKGROUND OF THE INVENTION

2. Field of the Invention

The present invention concerns angular velocity sensors and more particularly angular velocity sensors providing a fluid signal in response to an angular velocity input.

3. Description of the Prior Art

Angular velocity sensors typically produce a signal indicative of the rate at which an object under investigation is spinning. Fluidic angular velocity sensors produce a fluid signal, typically involving fluid pressure or current flow, indicative of the rate of rotation of a rotary input. Angular velocity sensors have a number of widespread applications. One common application concerns anti-locking mechanisms for vehicle brake control systems. The tires of automobiles, motorcycles and other vehicles typically slip slightly with respect to a road surface just before brake lock-up occurs. During this slippage, the time rate of change of the angular velocity of the tire, called angular acceleration, rises significantly. By monitoring this angular acceleration, brake lock-up can be avoided by briefly interrupting the braking force at or near the point of tire slippage, just before the onset of brake lock-up.

While several different types of electronic angular velocity sensors have been developed, numerous applications exist in high radiation, electromagnetic interference and other severe environments in which a fluidic angular velocity sensor would be more dependable than an electronic sensor. The severe conditions in proximity to a vehicle wheel, for example, militate towards use of a fluidic rather than an electronic type of angular velocity sensor. Fluidic angular velocity sensors have been developed in the past, two examples being disclosed in U.S. Pat. Nos. 3,942,557 and 3,347,103. Both of these fluidic sensors, however, require a pressurized fluid source and incorporate an angular velocity dependent fluid restrictive element. U.S. Pat. No. 3,942,557, for example, discloses an angular velocity sensor coupled to a pressurized fluid reservoir. A perforated cup-shaped rotor is disposed within the sensor and coupled to a rotary input. The flow of pressurized fluid past the cup-shaped rotor and consequently the output fluid pressure from the sensor is dependent upon the angular velocity of this rotor. Systems of this sort are not desirable in some applications, such as those in which size and weight are a consideration, since a pressurized fluid reservoir and fluid pressurizing source are generally required. Thus, there still exists a need for a less complex fluidic angular velocity sensor which does not require a pressurized fluid source or reservoir.

Some efforts have previously been made to incorporate a fluid pump into an angular velocity sensor to obviate the need for a pressurized fluid source or reservoir. Fluid pumps, however, typically produce periodic pressure fluxuations at the pump output usually resulting from the action of fluid displacing elements disposed within the pump in proximity to the pump output. These pressure fluctuations have thus far generally precluded the successful incorporation of fluid pumps into an angular velocity sensor. Thus, there still exists a need for a fluidic angular velocity sensor which does not require a pressurized fluid source and has a stable fluid signal output.

SUMMARY OF THE INVENTION

It is therefore an object of the present invention to provide a fluidic angular velocity sensor suitable for use in a wide variety of applications which does not require a pressurized fluid source or reservoir. It is a further objective of the present invention to provide a fluidic angular velocity sensor capable of producing a generally stable fluid signal output. A still further objective of the present invention is to provide a fluidic angular velocity sensor converting a variable rotational input motion into a variable fluid pressure signal approximately linear with the angular velocity of the rotational input.

To accomplish these and other goals and objectives, the present inventive fluidic angular velocity sensor includes a fluid pump with an impeller coupled to a rotational input. A negative or partial pressure signal is generated at the input to the pump. In one presently preferred embodiment the pump input is configured so as to define a generally cylindrical flow chamber having an output end leading to the impeller. An opposing flow chamber input is coupled to a fluid flow restrictive element. A negative pressure differential signal is measured across the input restrictive input element. Several flow restrictive elements may be disposed within the chamber to linearize the relationship between the angular velocity of the impeller and the pressure differential across the restrictive input element.

The novel features which are believed to be characteristic of the present invention, together with further objectives and advantages thereof, will be better understood from the following detailed description considered in connection with the accompanying drawings wherein like numbers designate like elements. It should be expressly understood, however, that the drawings are for purposes of illustration and description only and are not intended as a definition of the limits of the invention.

DETAILED DESCRIPTION

Figure 1:
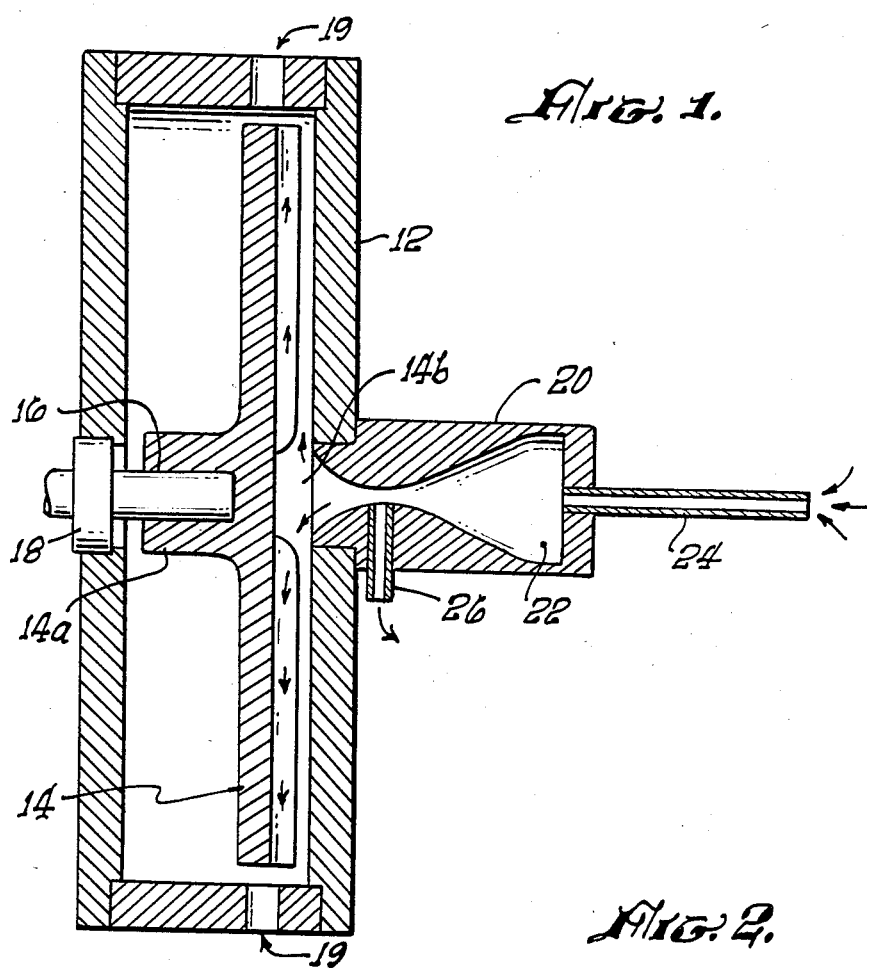
FIG. 1 is a sectional side view of one preferred embodiment of the present inventive fluidic angular velocity sensor.

Referring to the figures, and more particularly FIG. 1 thereof, there is shown a preferred embodiment of the present inventive fluidic angular velocity sensor. The sensor includes a housing 12 within which an impeller 14 is rotatably disposed. In FIG. 1 the impeller 14 is shown as a vane-type impeller. The impeller 14 may, however, have any suitable configuration typical of those commonly found in various forms of centrifugal-type fluid pumps. A shaft 16 is connected to the impeller 14 and suitably coupled to a rotating object under study. In an anti-locking brake system, for example, the shaft 16 could be suitably coupled to a vehicle wheel. A rotating fluid flow restrictive bearing or other common rotary seal 18 is disposed between the housing 12 and a rearward portion 14a of the impeller 14. Exhaust ports 19 are disposed about the housing 12 adjacent the impeller 14.

A differential housing element 20 is attached to the center of the housing 12 in front of an impeller input 14b. This differential housing 20 forms a flow chamber 22 within which a negative or partial fluid pressure is formed by the action of the impeller 14. The interior walls of the differential housing 20 may be configured to provide a curved restricted flow chamber 22 as shown in FIG. 1, or alternatively, configured as a straight generally cylindrical chamber. One end of the flow chamber 22 leads directly into the impeller input 14b while the opposing end of the flow chamber 22 is connected to a fluid flow restrictive input element 24. The input element 24 may be a capillary structure as illustrated in FIG. 1 or simply a plate having a small diameter input aperture. The output signal of the fluidic angular velocity sensor is measured as a pressure differential across the restrictive input 24. A port 26 is provided through the differential housing 20 for sensing the partial pressure within the flow chamber 22. The fluid pumped through the housing may be ambient air, in which case a pressure differential is measured between the ambient and the partial pressure sensed through port 26. Alternatively, the restrictive input 24 may be coupled to a separate fluid source with the pressure differential measured between the fluid source and the partial pressure within the flow chamber 22.

Figure 2:
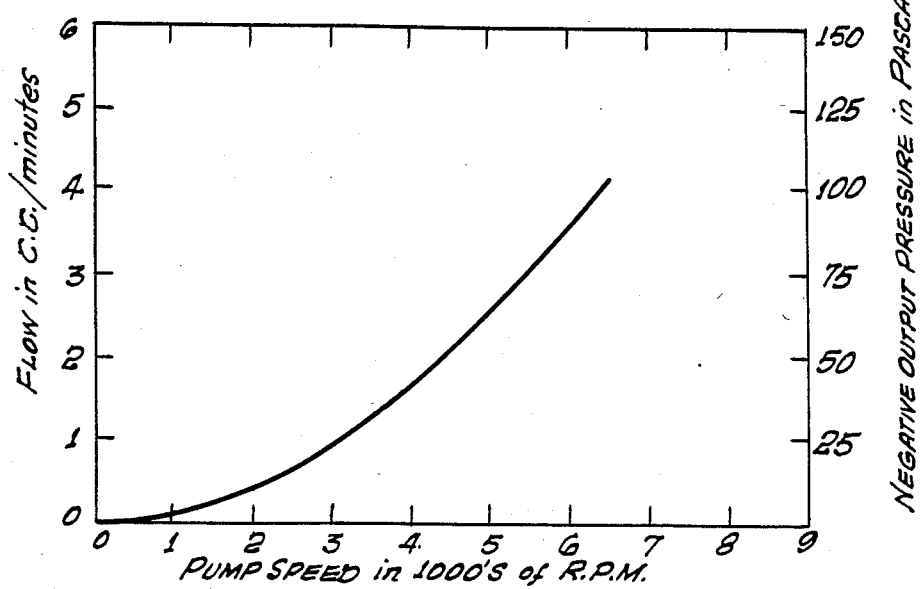
FIG. 2 is an illustrative graph comparing the impeller rotational velocity, pump fluid flow, and the differential pressure signal for the embodiment illustrated in FIG. 1.

In FIG. 2 a comparative graph is shown illustrating the change in differential pressure signal compared to the rotational velocity of the impeller 14. As can be seen, the pressure signal is related to the square of the impeller angular velocity. The curve is generally smooth and periodic fluctuations in the pressure signal typically encountered when measuring a pressure signal across the output of a pump are virtually eliminated. Virtually any type of pump structure which does not employ reciprocating fluid displacement elements may be employed with the differential housing 20 and related elements attached to the pump input. Pump structures employing reciprocating fluid displacement elements will usually generate partial pressure pulses at the input resulting in a noisy differential pressure signal.

A smooth differential pressure signal related to the square of an angular velocity input is generally sufficient for various applications of the present inventive fluidic angular velocity sensor. If desired, subsequent electronic manipulation of the pressure signal may be applied to obtain an electronic signal linearly proportional to the impeller angular velocity. In other applications of the present inventive sensor, however, a pressure signal generally linearly proportional to the impeller rotational velocity is desired. Where it is desirable to monitor the time rate of change of an angular velocity, for example, the pressure signal provided by the embodiment shown in FIG. 1 may be unsatisfactory since the time rate of change of the pressure signal will be velocity dependent.

Figure 3:
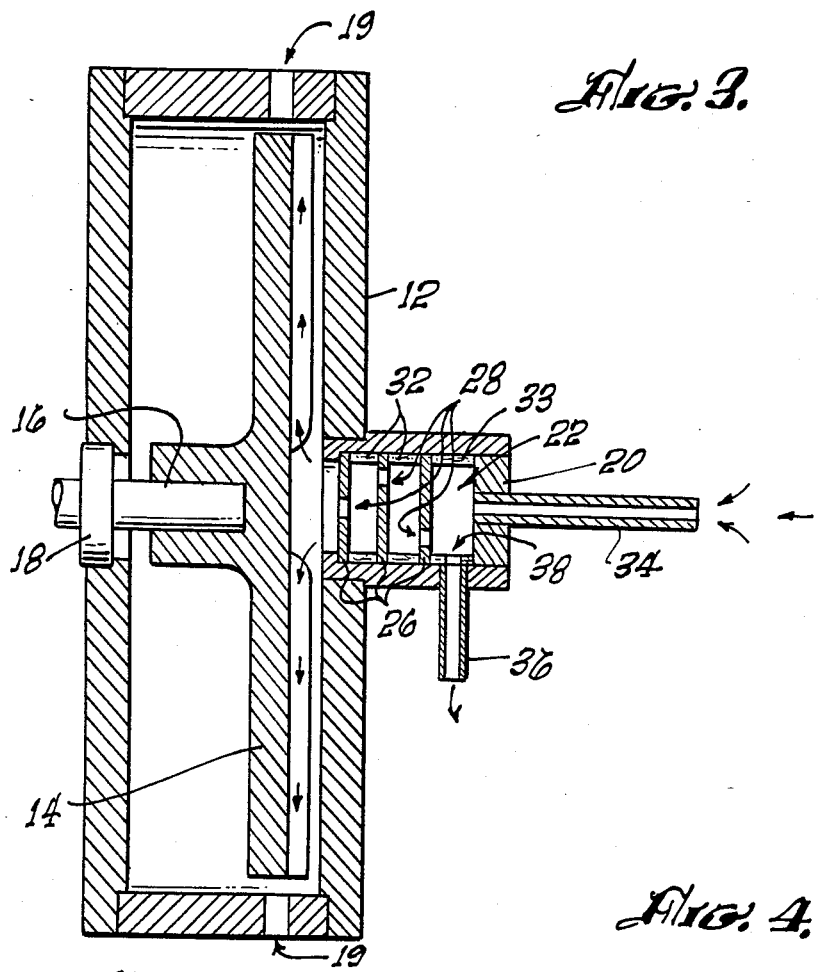
FIG. 3 is a sectional side view of a second preferred embodiment of the present inventive angular velocity sensor incorporating angular velocity linearizing elements.

An alternative embodiment of the present inventive fluidic angular velocity sensor providing an output pressure signal generally linear with the impeller angular velocity is shown in FIG. 3. In this embodiment the housing 12, impeller 14, shaft 16 and bearing 18 are configured the same as the embodiment illustrated in FIG. 1. The differential housing element 20, however, is configured so as to provide a generally cylindrical flow chamber 22 within which are disposed three fluid flow restricting orifice plates 26. Each of the orifice plates 26 is provided with a small diameter aperture 28. These apertures 28 may be located anywhere on the orifice plates 26. Spacers 32, 33 are disposed within the flow chamber 22 to maintain the orifice plates 26 in spaced apart relationship. The inner diameter of the flow chamber 22 is determined by the inner diameter of the spacers 32, 33. A flow restrictive capillary input element 34 is disposed at the input of the flow chamber 22. A pressure sensing port 36 is located in the differential housing 20 between the input of the flow chamber 22 and the first orifice plate 26. An appropriately configured bore or slot 38 is provided in spacer 33 to provide communication between the flow chamber 22 and the sensing port 36.

Figure 4:
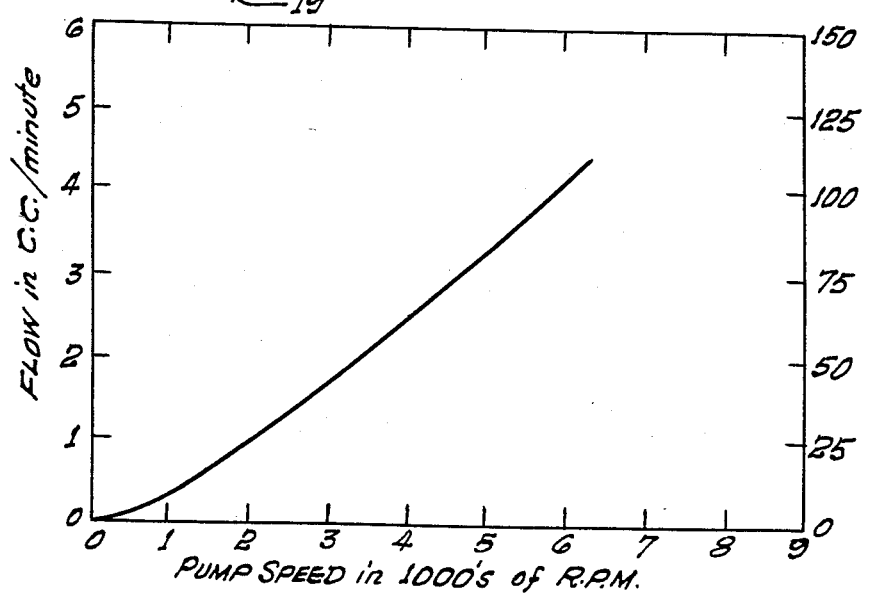
FIG. 4 is an illustrative graph comparing the impeller rotational velocity and the differential pressure signal for the embodiment illustrated in FIG. 3.

The linearity of the relationship between the impeller rotational velocity and the differential pressure signal may be maximized and the response time of the pressure signal to variations in angular velocity input minimized by varying the length to inner diameter ratio of the capillary element 34, number of orifice plates 26, length of the flow chamber 22, and ratio of the orifice plate aperture 28 diameters to the flow chamber 22 inner diameter. In one embodiment, a 2 inch long capillary input 34 having a 0.05 inch inner diameter was used in conjunction with a 0.50 inch long flow chamber 22 having a 0.25 inch inner diameter. Three orifice plates 26 were provided each having an aperture diameter of approximately 0.033 inch. The resulting pressure signal compared with the impeller angular velocity is illustrated in FIG. 4. It has been found that approximately 0.008 inch variations in the diameter of the orifice plates 26 do not seriously affect the linearity of the relationship between pressure signal and angular velocity. While a greater degree of linearization may be obtained by increasing the length to inner diameter ratio of the capillary input 34, a ratio of less than 50 to 1 will decrease the linearization.

Figure 5:
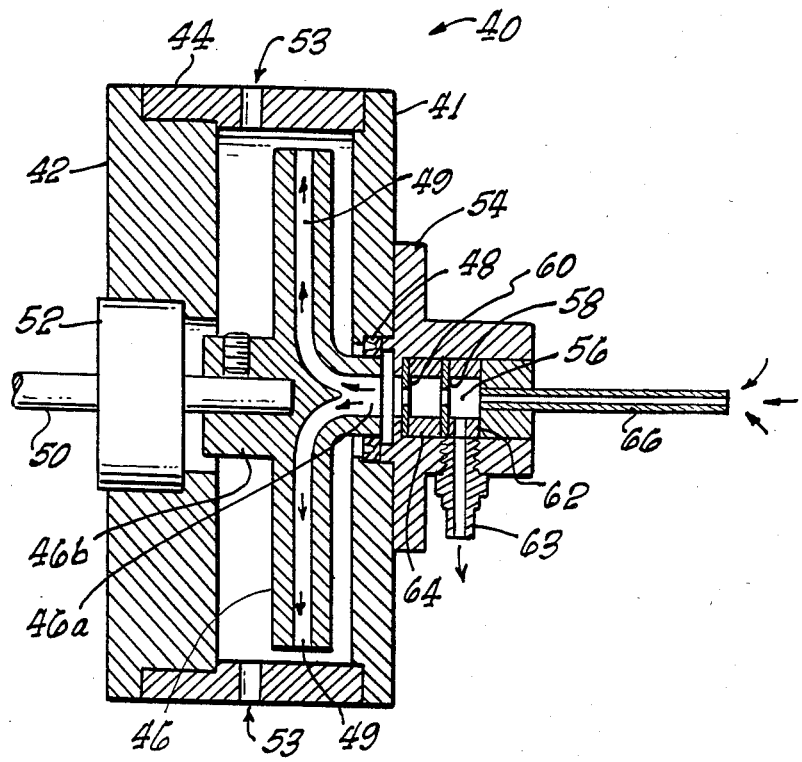
FIG. 5 is a sectional side view of yet another embodiment of the present inventive angular velocity sensor including angular velocity linearizing elements.

A further embodiment of the present inventive fluidic angular velocity sensor is illustrated in FIG. 5. In this embodiment a centrifugal-type pump housing 40 is formed by forward and rearward housing faces 41, 42 and a cylindrical housing wall 44. An impeller 46 is rotatably disposed within the housing 40 with an input portion 46a of the impeller 46 suitably journaled in an aperture of the forward housing face 41 by a fluid sealing bearing 48. The rearward portion 46b of the impeller is connected to a rotating input shaft 50 which is suitably journaled by a bearing 52 in an aperture of the rearward housing 42. Exhaust ports 53 are provided about the cylindrical housing wall 44 directly behind the impeller 46. In this embodiment, the impeller 46 is provided with a plurality of passageways 49 terminating about the periphery of the impeller 46 and merging at the impeller input 46a.

A differential housing 54 is attached to the forward housing face 41. The differential housing 54 forms a flow cavity 56 within which are disposed orifice plates 58, 60 maintained in spaced apart relationship by spacers 62, 64. Each of the orifice plates 58, 60 is provided with a small diameter aperture. The inner surface of the spacers 62, 64 form the inner surface of the flow chamber 56. A capillary input element 66 is connected to the input of the flow chamber 56 with the output of the flow chamber 56 communicating with the impeller input 46a. A pressure sensing port 68 is provided between the input of the flow chamber 56 and the first orifice plate 58. Spacer 62 is provided with an appropriate bore or groove to allow communication between the flow chamber 56 and sensing port 68.

Figure 6:
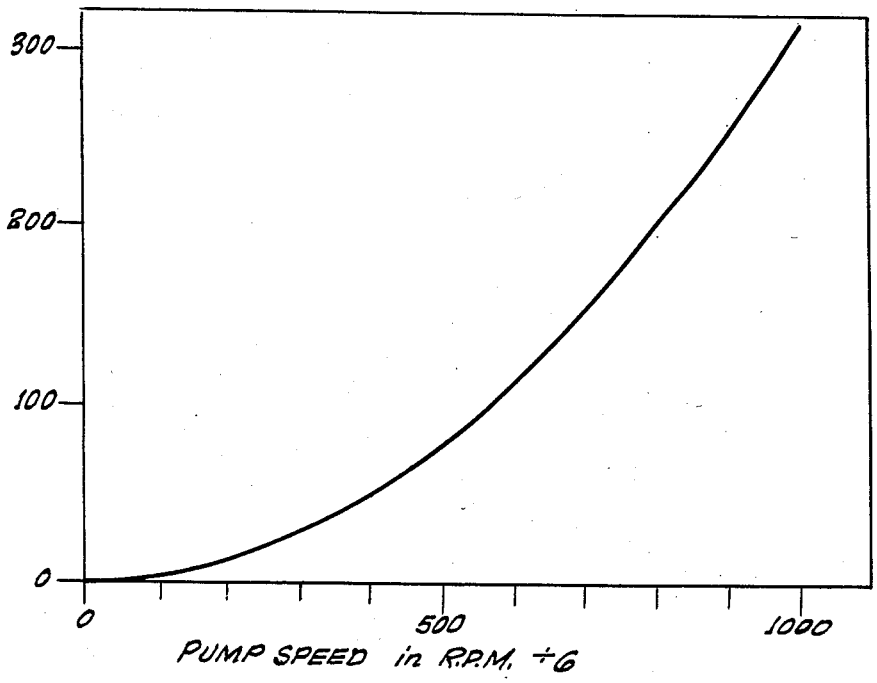
FIG. 6 is an illustrative graph comparing the impeller rotational velocity and the differential pressure signal for the embodiment illustrated in FIG. 5 with the fluid flow linearizing elements removed.
Figure 7:
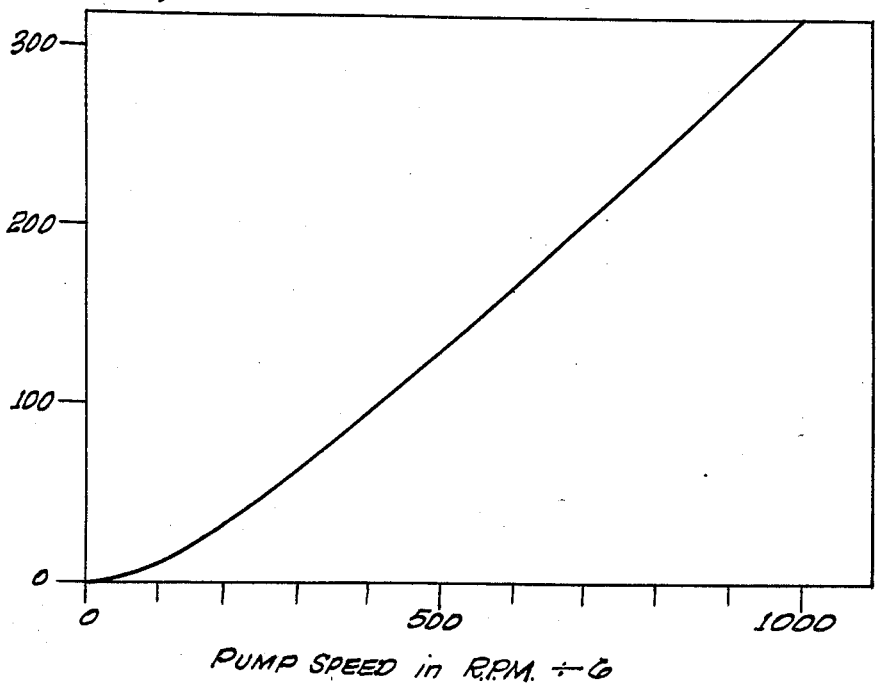
FIG. 7 is an illustrative graph comparing the impeller rotational and the differential pressure signal for the embodiment illustrated FIG. 5 with the velocity linearizing elements included.

In one instance the embodiment illustrated in FIG. 5 was constructed with a flow chamber having a 0.50 inch length and 0.25 inch inner diameter connected to a 2 inch long capillary input having a 0.050 inch inner diameter. Orifice plate 58 was provided with a 0.022 inch diameter aperture at its center while orifice plate 60 was provided with a 0.044 inch diameter aperture at its center. A graph comparing the differential pressure signal across the capillary input with the rotational velocity of the impeller when the orifice plates 58, 60 were removed is shown in FIG. 6. A similar graph with the orifice plates 58, 60 inserted is shown in FIG. 7. As shown in FIG. 7, the orifice plates 58, 60 provide linearization of the relationship between rotational velocity and flow chamber pressure over a wide range of impeller rotational velocities. Further tests made with both orifice plates 58, 60 having a 0.022 inch diameter aperture also provided a generally linear relationship. Other variations in the orifice plate aperture diameters could be employed with a generally linear relationship remaining as well.

The embodiment illustrated in FIG. 5 provides a generally stronger pressure signal than the embodiment illustrated in FIG. 3. Both would be suitable for a wide variety of angular velocity sensing applications in which a linear relationship between an input angular velocity and the differential pressure output signal is desired. In applications such as brake anti-locking systems where a time rate of change of the angular velocity is desired, the pressure signal from the sensing port 36 may be fed into a fluidic differentiator to obtain the desired time rate of change. Fluidic differentiators are well known in the prior art, one embodiment being disclosed in U.S. Pat. No. 3,942,557.

It will, of course, be understood that modifications of the present inventive fluidic angular velocity sensor and its various aspects will be apparent to those skilled in the art. For example, the exhaust ports 53 in the cylindrical housing wall 44 of the embodiment illustrated in FIG. 5 could be directly coupled to the capillary input 68 to provide a closed system in applications where the accumulation of debris within the flow chamber is a concern. Thus, the scope of the present invention should not be limited by the particular embodiments and examples described herein, but should only be defined by the appended claims and equivalents thereof.

What is claimed is:

1. A fluidic sensor for sensing the angular velocity of a spinning object comprising:
    a pump having a fluid displacing element disposed therein and rotationally coupled to said object;
    a housing connected to an input of said pump, said housing defining a fluid flow chamber having an output communicating with said pump input and a port through said housing communicating with said flow chamber;
    a fluid flow restrictive input element connected to an input of said flow chamber; and
    a plurality of flow restrictive plates disposed within said flow chamber between said housing port and of said flow chamber output, each plate having an aperture, wherein a differential pressure signal from said housing port with respect to said restrictive input element is approximately linearly proportional to the angular velocity of said fluid displacing element.

2. The fluidic sensor of claim 1 wherein said flow chamber has a length to inner diameter ratio of approximately 2:1, said flow restrictive element has a length to inner diameter ratio of at least 50:1, and at least two of said plates are disposed within said flow chamber each having an aperture diameter approximately 1/10 the diameter of said flow chamber.

3. The fluidic sensor of claim 1 wherein said flow chamber has a length to inner diameter ratio of approximately 2:1, said flow restrictive element has a length to inner diameter ratio of at least 50:1, a first plate having an aperture diameter approximately 1/10 the flow chamber diameter is disposed within said flow chamber and a second plate, having an aperture diameter approximately twice the aperture diameter of said first plate, is disposed within said flow chamber between said first plate and said flow chamber output.

4. The fluidic sensor of claim 1 wherein said flow chamber has a length of inner diameter rato of approximately 2:1, said flow restrictive element has a length to inner diameter ratio of at least 50:1, and at least three plates, each having an aperture diameter approximately 1/7.5 the flow chamber diameter are disposed within said flow chamber.

5. A fluidic sensor, for sensing the angular velocity of a spinning object comprising:
    a fluid pump including a fluid displacing element disposed therein which is rotationally coupled to said spinning object;
    a housing connected to an axial input of said pump, said housing defining a fluid flow chamber having a fluid flow restrictive input and a port through said housing communicating with said flow chamber to provide a differential pressure signal with respect to said restrictive input which is indicative of the rotational velocity of said spinning object, and
    linearization means disposed within said housing between said housing port and an output of said flow chamber for linearizing the relationship between the angular velocity of the fluid displacing element and said differential pressure signal.

* * * * *